(12) United States Patent
Koizumi

(10) Patent No.: US 12,250,500 B2
(45) Date of Patent: Mar. 11, 2025

(54) IMAGE PROJECTION SYSTEM AND IMAGE PROJECTION METHOD

(71) Applicant: SONY INTERACTIVE ENTERTAINMENT INC., Tokyo (JP)

(72) Inventor: Makoto Koizumi, Saitama (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 41 days.

(21) Appl. No.: 18/326,006

(22) Filed: May 31, 2023

(65) Prior Publication Data

US 2023/0396746 A1 Dec. 7, 2023

(30) Foreign Application Priority Data

Jun. 6, 2022 (JP) ................................ 2022-091632

(51) Int. Cl.
*H04N 9/31* (2006.01)
*G06T 7/521* (2017.01)

(52) U.S. Cl.
CPC ........... *H04N 9/3194* (2013.01); *G06T 7/521* (2017.01); *H04N 9/3135* (2013.01); *H04N 9/3161* (2013.01); *H04N 9/3185* (2013.01); *G06T 2207/10028* (2013.01)

(58) Field of Classification Search
CPC .. H04N 9/3194; H04N 9/3135; H04N 9/3161; H04N 9/3185; G06T 7/521; G06T 2207/10028
USPC ........................................................ 348/744
See application file for complete search history.

(56) References Cited

U.S. PATENT DOCUMENTS 9,832,436 B1 * 11/2017 Fuchikami ........... H04N 9/3194
2002/0133144 A1 * 9/2002 Chan ....................... A61F 9/008
606/4
2023/0221110 A1 * 7/2023 Nakagawa ............ G01S 7/4865
356/5.01

OTHER PUBLICATIONS

Nick Staff, "Sony's touchscreen projector technology feels like the future of interactivity", [online], Mar. 12, 2017, The Verge, [Searched Apr. 28, 2022], Internet, <URL:https://www.theverge.com/2017/3/12/14899804/sony-touchscreen-projector-display-prototype-sxsw-2017>, p. 1-7.
Uwe Lippmann, et al., "In Good Light: A New High-Speed Projector with Visible and Infrared Capabilities", [online], Dec. 13, 2021, Tokyo Institute of Technology, [Searched Apr. 28, 2022] , Internet, <URL:https://www.titech.ac.jp/english/news/2021/062614>, p. 1-3.

* cited by examiner

*Primary Examiner* — Trang U Tran
(74) *Attorney, Agent, or Firm* — HEA Law PLLC

(57) ABSTRACT

Provided is an image projection system including an image projection unit that irradiates a physical object with image laser light for forming pixels of an image to be projected on the physical object, a reference light irradiation unit that irradiates the physical object with reference laser light emitted through an emission port common to the image laser light, and a shape measurement unit that detects, at a position circumscribing the emission port, the reference laser light reflected from the physical object and measures a three-dimensional shape of the physical object on the basis of a result of the detection.

12 Claims, 9 Drawing Sheets

IMAGE PROJECTION SYSTEM AND IMAGE PROJECTION METHOD

CROSS REFERENCE TO RELATED APPLICATION

This application claims the benefit of Japanese Priority Patent Application JP 2022-091632 filed Jun. 6, 2022, the entire contents of which are incorporated herein by reference.

BACKGROUND

The present disclosure relates to an image projection system and an image projection method for projecting an image on a physical object.

There has been known projection mapping by which an image adjusted to a shape of a three-dimensional object such as a building is projected on the three-dimensional object such that a virtual change is provided to an appearance of the three-dimensional object or such that the three-dimensional object looks as if it were moving. In recent years, also a technology of changing a projection image in such a manner as to follow a movement of an article or a human body has been practically used, and a representation and a user interface having a higher degree of freedom have been implemented (for example, Nick Staff, "Sony's touchscreen projector technology feels like the future of interactivity," [online], Mar. 12, 2017, THE VERGE, [searched Apr. 28, 2022], Internet <URL: https://www.theverge.com/2017/3/12/14899804/sony-touchscreen-projector-display-prototype-sxsw-2017>). Further, there has been developed a technology by which, by projecting an RGB image and an infrared image in a superposed relation on each other, sensing of the shape of a three-dimensional object is performed in parallel to image projection (for example, refer to Uwe Lippmann and 9 others, "In Good Light: A New High-Speed Projector with Visible and Infrared Capabilities," [online], Dec. 13, 2021, Tokyo Institute of Technology, [searched Apr. 28, 2022], Internet <URL: https://www.titech.ac.jp/english/news/2021/062614>).

SUMMARY

In projection mapping, it is important to cause a projection image to look as if it were a surface itself of a three-dimensional object. To this end, it may be necessary to accurately acquire a position, a shape, a posture, and so forth of the three-dimensional object and adjust the projection image appropriately by using them. However, if it is intended to implement a more definite representation, then a more advanced sensing technology may be required, and this makes implementation of the sensing technology at a low cost difficult. Further, in general, in order to reflect a sensing result on an image, complicated computation such as coordinate conversion may be required, and time may be required for processing. This is a problem especially in a mode in which a movement of a three-dimensional object itself is permitted.

The present disclosure has been made in view of such problems as described above, and it is desirable to provide a technology that easily implements projection mapping with a high degree of accuracy.

According to an aspect of the present disclosure, there is provided an image projection system including an image projection unit that irradiates a physical object with image laser light for forming pixels of an image to be projected on the physical object, a reference light irradiation unit that irradiates the physical object with reference laser light emitted through an emission port common to the image laser light, and a shape measurement unit that detects, at a position circumscribing the emission port, the reference laser light reflected from the physical object and measures a three-dimensional shape of the physical object on the basis of a result of the detection.

According to another aspect of the present disclosure, there is provided an image projection method by an image projection system. The image projection method includes irradiating a physical object with image laser light for forming pixels of an image to be projected on the physical object, irradiating the physical object with reference laser light emitted through an emission port common to the image laser light, and detecting, at a position circumscribing the emission port, the reference laser light reflected from the physical object and measuring a three-dimensional shape of the physical object on the basis of a result of the detection.

It is to be noted that any combination of the components described above and representations of the present disclosure where they are converted between a method, an apparatus, a system, a computer program, a recording medium on which the computer program is recorded are also effective as modes of the present disclosure.

With the present disclosure, projection mapping with a high degree of accuracy can easily be implemented at a low cost.

DETAILED DESCRIPTION OF THE PREFERRED EMBODIMENT

Figure 1:
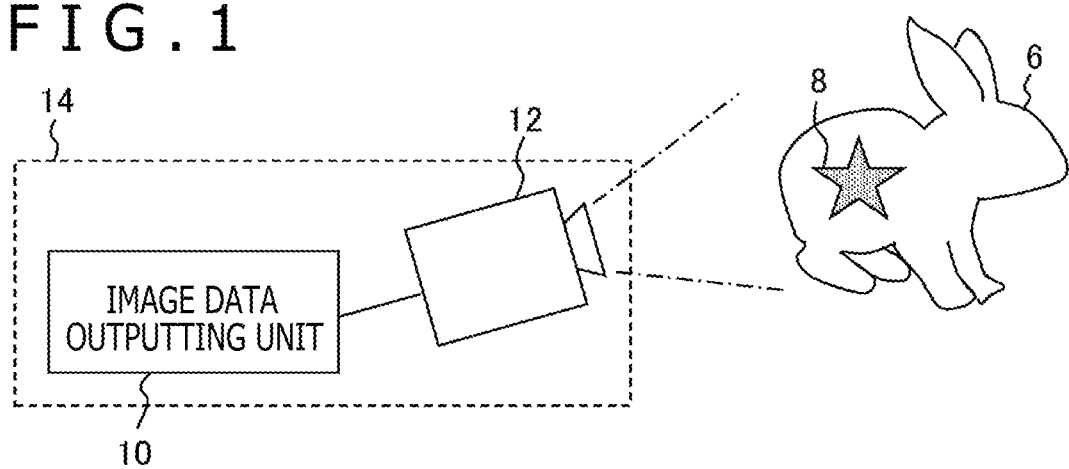
FIG. 1 is a block diagram depicting an example of a configuration of an image projection system that implements projection mapping according to an embodiment of the present disclosure.

FIG. 1 depicts an example of a configuration of an image projection system that implements projection mapping according to an embodiment of the present disclosure. With reference to FIG. 1, an image projection system 14 includes an image data outputting unit 10 and a light irradiation unit 12. The image data outputting unit 10 outputs data of an image to be projected on a physical object 6 to the light irradiation unit 12. The light irradiation unit 12 acquires the data and irradiates the physical object 6 with laser light, which represents a color of each pixel that configures an image, to project an image 8 on a surface of the physical object 6.

The light irradiation unit 12 further has a function of measuring a three-dimensional shape of the physical object 6. In particular, the light irradiation unit 12 irradiates the physical object 6 with reference light (laser light for reference) such as infrared light on the physical object 6 and observes reflected light from the physical object 6 to acquire a distance to the surface of the physical object 6. Here, the light irradiation unit 12 applies the reference laser light through an emission port common to the laser light for forming each pixel of the image 8.

Preferably, the light irradiation unit 12 applies the reference laser light coaxially with the laser light for forming each pixel of the image 8. Consequently, the reference laser light is applied in a unit of a pixel to and reflected from the physical object 6. The light irradiation unit 12 performs emission and observation of the reference laser light at the same position together with projection of the image 8 to acquire the distance to the physical object 6 as a two-dimensional distribution on the surface of the physical object 6.

The two-dimensional distribution of the distance to the surface of the physical object 6 represents a position, a shape, and a posture of the physical object 6. The parameters of them are hereinafter collectively referred to as a "three-dimensional shape" of the physical object 6. The image data outputting unit 10 adaptively adjusts an image to be made a projection source, according to a three-dimensional shape of the physical object 6 obtained last, such that projection mapping is performed with a high degree of accuracy.

For example, the image data outputting unit 10 expands, contracts, or shades an image in such a manner as to conform to the physical object 6 in terms of the posture or unevenness. Alternatively, the image data outputting unit 10 performs such editing as translation, rotation, or deformation according to a movement of the physical object 6. Since such image adjustment can be performed applying a general technology, in the following description, a mechanism for acquiring a three-dimensional shape of the physical object 6 with a high degree of accuracy while the image 8 is projected is described.

Figure 2:
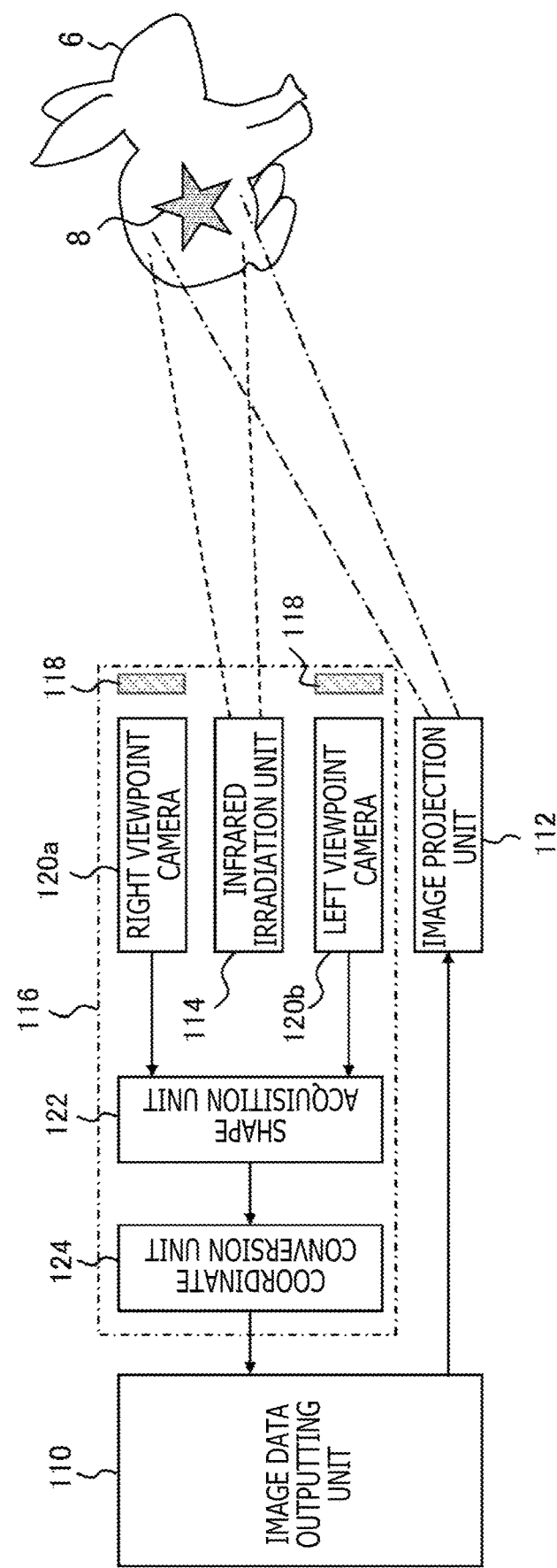
FIG. 2 is a block diagram depicting an example of a configuration of an existing system that simultaneously implements acquisition of a three-dimensional shape of a physical object and projection of an image.

Here, in order to make advantageous effects of the present embodiment clear, an existing technology that projects an image while acquiring a three-dimensional shape of a physical object is exemplified. FIG. 2 depicts an example of a configuration of an existing system that simultaneously implements acquisition of a three-dimensional shape of the physical object 6 and projection of an image. This system is configured such that it includes, in addition to an image projection unit 112 that projects an image 8 on the physical object 6, a shape measurement device 116 that measures a three-dimensional shape of the physical object 6.

FIG. 2 assumes, as a shape measuring technique of a physical object, a patterned stereo method that projects an infrared image of a specific pattern such as an array of dots on the physical object 6 and captures the projected infrared image by a stereo camera to obtain a parallax. In particular, an infrared irradiation unit 114 of the shape measurement device 116 irradiates the physical object 6 with an infrared image of a specific pattern. The stereo camera includes a right viewpoint camera 120a and a left viewpoint camera 120b, and includes an infrared pass filter 118, which passes light of an infrared wavelength band therethrough, in front of an imaging plane of each of the right viewpoint camera 120a and the left viewpoint camera 120b. Thus, the stereo camera performs shooting in stereo of a picture of an infrared pattern with which the physical object 6 is irradiated.

A shape acquisition unit 122 calculates a distance to the physical object 6 by the principle of trigonometry on the basis of a parallax appearing between two pictures of the infrared patterns in the captured stereo image. The distance value is obtained in units of feature points that configure the infrared pattern, such as dots. As a result, the shape acquisition unit 122 can acquire a distribution of distances on the surface of the physical object 6 at a granularity of the feature points and hence can calculate a three-dimensional shape of the physical object 6. However, the three-dimensional shape in this case is information on a camera coordinate system that is based on the imaging plane of the right viewpoint camera 120a or the left viewpoint camera 120b.

Therefore, the shape measurement device 116 includes a coordinate conversion unit 124 and converts information relating to a three-dimensional shape of the physical object 6 on the camera coordinate system into information on a coordinate system that is based on the projection plane of the image projection unit 112 (plane of the light emitting element that is the projection source of the image 8). An image data outputting unit 110 adjusts an image to be projected, on the basis of information relating to the three-dimensional shape, the information being obtained after the coordinate conversion is performed, and outputs a resulting image to the image projection unit 112. The image projection unit 112 projects the image, on which the result of the shape measurement is reflected in this manner, to the physical object 6. By repeating the processes described above, even if the state of the physical object 6 changes, it is possible to continue to project the image 8 conforming to the change.

Figure 3:
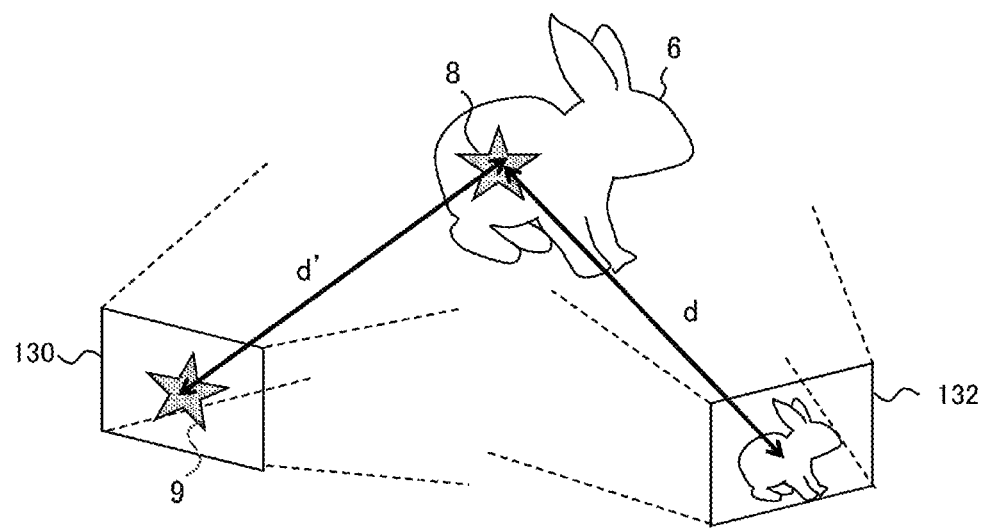
FIG. 3 is a schematic view illustrating the necessity for coordinate conversion in the existing technology.

FIG. 3 is a view illustrating the necessity for the coordinate conversion in the existing technology. As described above, the shape acquisition unit 122 obtains a distribution of distances (for example, a distance d) from an imaging plane 132 of one of the right viewpoint camera 120a and the left viewpoint camera 120b to the physical object 6 and further obtains information relating to a three-dimensional shape of the physical target with reference to the imaging plane 132. Meanwhile, for adjustment of the image, information relating to a three-dimensional shape as viewed from a projection plane 130 of the image projection unit 112 may be required. For example, when the physical object 6 moves away from the projection plane 130, in order to cause the image 8 to look as a design of the physical object 6, it may be necessary to reduce an image 9 of the projection source, according to an increase of the distance from the projection plane 130 (for example, a distance d').

To this end, the coordinate conversion unit 124 performs coordinate conversion of information relating to a three-dimensional shape acquired by the shape acquisition unit 122, to acquire information relating to the three-dimensional shape with reference to the projection plane 130. Since the information after the conversion has a significant influence on a result of projection of an image, it may be necessary to strictly perform calibration in advance between the projection system of an image and an observation system of infrared rays to obtain a conversion parameter with a high degree of accuracy. Even if this countermeasure is taken, since the process for coordinate conversion is involved, this increases the probability that an error may occur and gives rise to a problem of insurance of processing resources and a problem of delay time.

Further, according to the configuration described above, depending upon the shape or the orientation of the physical object 6, a portion which is in a blind angle on the imaging plane 132 although it is included in the visual field of the projection plane 130 appears in some cases. In this case, the shape of the blind spot portion becomes indeterminate, and accurate generation of a projection image becomes difficult. Moreover, the infrared irradiation unit 114 and the shape measurement device 116 that includes various cameras may be required in addition to the image projection unit 112, and the entire system is likely to become complicated and large-sized. As a result, there is also a problem that the design of the appearance is constrained or the production cost increases.

Such problems as described above similarly arise as long as the projection plane 130 and the imaging plane 132 are provided in the system, irrespective of a shape measurement technique such as a grid projection method by which a grid-like infrared image is projected and the projected picture is observed to acquire a three-dimensional shape of the physical object 6. However, in the case of the patterned stereo method, a process for extracting corresponding points of infrared patterns in two images of a stereo image may be required, and this further increases the calculation cost. Further, since a stereo camera may be required, this is disadvantageous in terms of the production cost and size reduction of an apparatus.

Meanwhile, there has been proposed a technology in which the image projection unit 112 includes a digital micromirror device and infrared light is applied, from the infrared irradiation unit 114, in a superposed relation with the plane of a projection image (for example, refer to Uwe Lippmann and 9 others, "In Good Light: A New High-Speed Projector with Visible and Infrared Capabilities," [online], Dec. 13, 2021, Tokyo Institute of Technology, [searched Apr. 28, 2022], Internet <URL: https://www.titech.ac.jp/english/news/2021/062614>). In this case, a three-dimensional shape of a region that coincides with a region on a surface of a physical object that is a projection destination can be acquired with a high resolution. However, it may be necessary to separately provide a camera that observes infrared light, and this similarly gives rise to problems of increase of the calculation cost for coordinate conversion, presence of a blind angle, and increase of the production cost.

In the present embodiment, laser light for projecting an image and reference laser light for obtaining a three-dimensional shape of a physical object are caused to be emitted through a common emission port such that they are applied in a superposed relation in units of pixels. Then, it is made possible to observe reflection of the reference laser light at a position circumscribing the emission port. In particular, a laser light scanning method is adopted for projection of an image, and irradiation with light and observation in units of pixels are repeated while the position of the emission destination is successively changed, to perform shape measurement time-divisionally together with projection of an image. Consequently, there is no necessity to additionally provide the projection plane 130 and the imaging plane 132, and image projection with a high degree of accuracy is implemented at a low cost.

Figure 4:
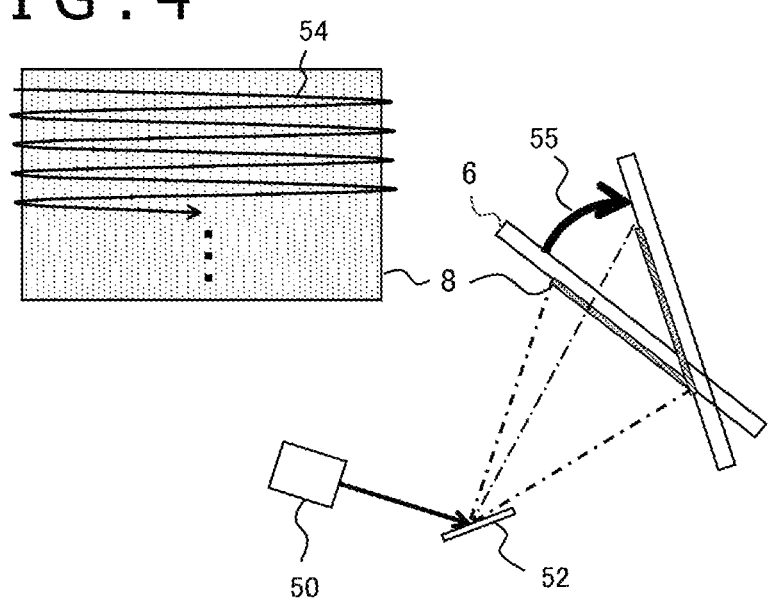
FIG. 4 is a view illustrating an image projection technology of a laser light scanning method adopted in the present embodiment.

FIG. 4 is a view illustrating an image projection technology of the laser light scanning method adopted in the present embodiment. The laser light scanning method is a technique of causing laser light corresponding to pixels to perform two-dimensional scanning using a mirror for deflection to thereby form an image on a physical object. For example, an image laser light source 50 outputs laser light that includes components of red (R), green (G), and blue (B). The laser light is reflected by a mirror 52 and projected on the surface of the physical object 6.

At an upper left portion in FIG. 4, the projected image 8 is depicted in a state in which it is viewed from the front. By controlling the angle of the mirror 52 around two axes, it is possible to move the arrival point of the laser light from the top to the bottom while it is oscillated leftwardly and downwardly, for example, as indicated by an arrow mark 54. The image laser light source 50 generates laser light representative of a color of each pixel, in such a manner as to synchronize with the movement of the arrival point of the laser light. Consequently, an image 8 having pixels of the colors of the laser light outputted at the individual points of time is formed. It is to be noted that a video projection apparatus that utilizes reflection by a mirror is disclosed, for example, in Japanese Patent Laid-Open No. 2017-83657 and so forth.

Here, for example, if it is assumed that the inclination of the physical object 6 changes as indicated by an arrow mark 55, then the image data outputting unit 10 adjusts data of the image of the projection source according to the change, so that it is possible to cause the image 8 to look as if it were the surface itself of the physical object 6. In the example depicted in FIG. 4, the image data outputting unit 10 reduces the image 8, for example, in the vertical direction. In practice, adjustment of the image is more complicated as well by change of the position, the posture, or the shape of the physical object as described hereinabove.

In any case, in the present embodiment, reference laser light for shape measurement is also reflected by the mirror 52, so that irradiation with the reference laser light along a path of, preferably, in a coaxial relation with, the laser light for an image. Further, by utilizing such an irradiation mechanism at a "point" such that reflection of the reference laser light is detected at a position proximate to the mirror 52, information relating to a three-dimensional shape of the physical object 6 with reference to the emission position of the image laser light is directly obtained.

Figure 5:
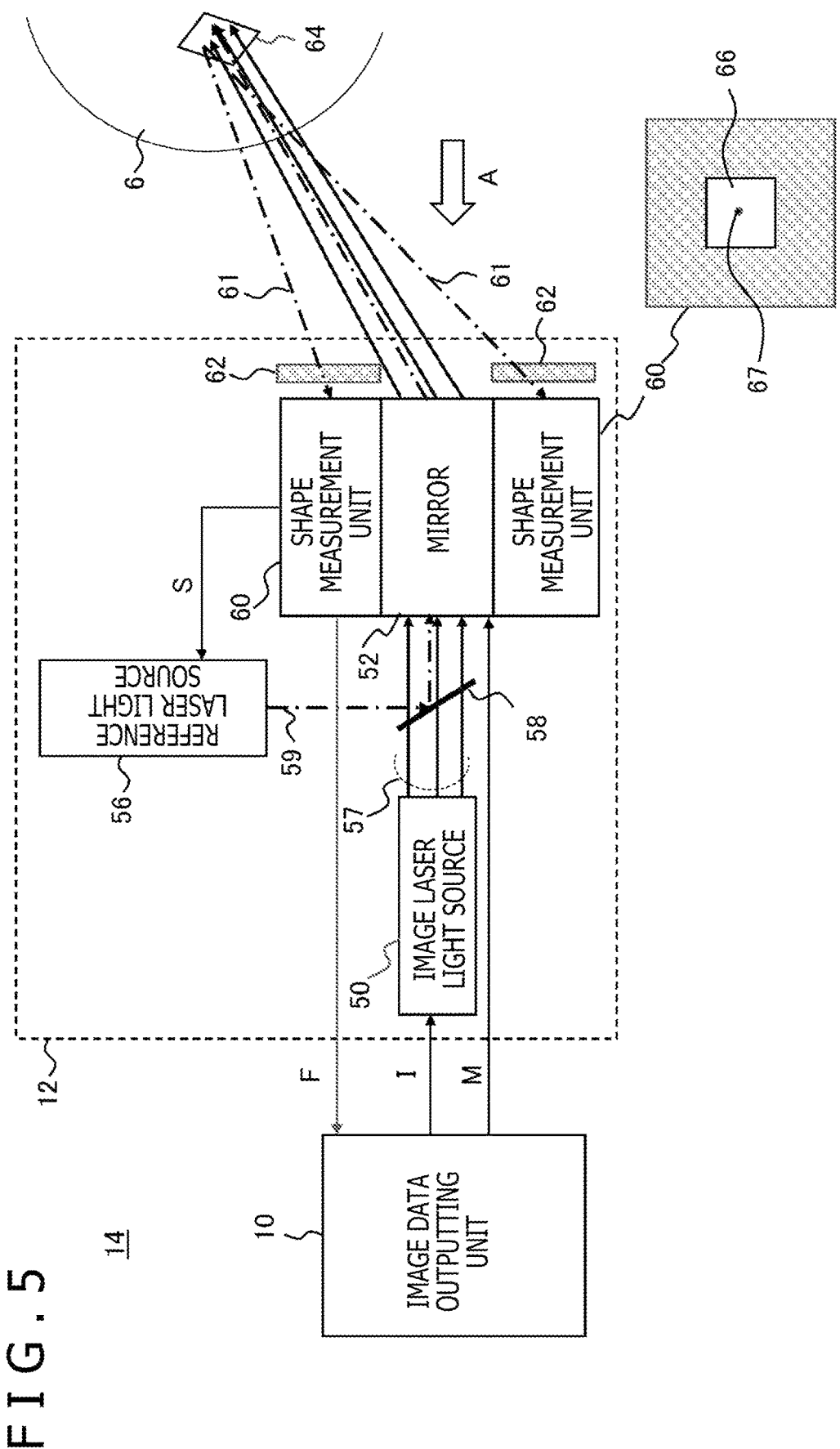
FIG. 5 is a block diagram depicting a detailed configuration of the image projection system according to the present embodiment.

FIG. 5 depicts a detailed configuration of the image projection system according to the present embodiment. As described hereinabove, the image projection system 14 includes the image data outputting unit 10 and the light irradiation unit 12. The light irradiation unit 12 includes, as depicted in FIG. 4, the image laser light source 50 and the mirror 52 as an image projection unit that irradiates the physical object 6 with light for forming pixels of an image to be projected on the physical object 6. The image laser light source 50 time-divisionally generates image laser light 57, which represents a color of each pixel of the projection image, on the basis of image data I outputted from the image data outputting unit 10.

Although the image laser light 57 includes three different kinds of light, that is, three laser beams corresponding, for example, to R, G, and B, the wavelength or the number of such laser beams is not restrictive as long as the laser beams represent colors corresponding to pixel values. As the mirror 52, for example, a micro electro mechanical systems (MEMS) mirror is used. The MEMS mirror is a device that is small in size and low in power consumption and can be controlled with a high degree of accuracy in regard to the angle change around two axes by electromagnetic driving. However, the driving method of the mirror 52 is not specifically restrictive. The mirror 52 is changed in terms of the angle by a control signal M from the image data outputting unit 10 such that the image laser light 57 is reflected in such a manner as to arrive at an appropriate position on the physical object 6.

The light irradiation unit 12 further includes a reference laser light source 56, a beam splitter 58, a reference laser light pass filter 62, and a shape measurement unit 60. The reference laser light source 56 outputs reference laser light for measuring a three-dimensional shape of the physical object 6, and the beam splitter 58 superposes the reference laser light on the image laser light and introduces the resulting light to the mirror 52. The reference laser light pass filter 62 passes therethrough light of the wavelength of the reference laser light, and the shape measurement unit 60 detects reflected light of the reference laser light to acquire the distance to the physical object 6 and further acquire three-dimensional shape information relating to the physical object 6.

In the configuration of the light irradiation unit 12 described above, the reference laser light source 56, the beam splitter 58, and the mirror 52 configure a reference light irradiation unit that applies reference laser light through an emission port common to the image laser light 57. The reference laser light source 56 generates, as reference laser light 59, near infrared laser light of a pulse width of, for example, 100 picoseconds to several nanoseconds. The beam splitter 58 is provided such that it superposes the image laser light 57 and the reference laser light 59 on each other and introduces the resulting light to the mirror 52.

Consequently, the image laser light 57 and the reference laser light 59 are reflected in the superposed state by the mirror 52 and arrive at a position of each pixel (for example, a pixel 64) on the surface of the physical object 6. It is to be noted that it is sufficient if the image laser light 57 and the reference laser light 59 advance in a substantially common axial direction and arrive at the physical object 6, and whether or not they are superposed on each other or the degree of such superposition is not restrictive. In the description of the present embodiment, this state is referred to as "coaxial" in some cases.

The shape measurement unit 60 detects light of the reference laser light reflected from the physical object 6, to acquire information relating to a three-dimensional shape of the physical object 6. The shape measurement unit 60 includes, for example, a direct time of flight (dTOF) sensor and is driven in synchronism with emission of the reference laser light 59. In particular, the reference laser light source 56 cyclically generates a pulse of the reference laser light 59 in response to a synchronizing signal S that is inputted from the shape measurement unit 60 that serves as a trigger. The shape measurement unit 60 repeatedly measures the time difference between the emission timing of the reference laser light 59 based on the outputting time of the synchronizing signal S and the detection timing of the reflection light 61 of the reference laser light 59 to acquire the distance to the physical object 6.

Where the time difference between emission of the reference laser light 59 and detection of the reflection light 61 is represented by $\Delta t$ and the velocity of light is represented by c, a distance D from a light reception surface of the shape measurement unit 60 to each pixel (for example, the pixel 64) on the surface of the physical object 6 can be calculated in principle by the following expression.

$$D = c \times \Delta t / 2$$

It is to be noted that, in the present embodiment, the technique for measuring the distance to a physical object by detecting reflection of reference laser light is not limited to the dTOF. For example, it is also possible to adopt an indirect time of flight (iTOF) method of cyclically modulating reference laser light and calculating the distance on the basis of a displacement in phase between the reference laser light and the reflected light.

In the present embodiment, the mirror 52 is used to two-dimensionally displace the arriving destination of the reference laser light 59 together with the image laser light 57 and therefore acquires a reflection position of the reference laser light 59 to thereby acquire the distance to the physical object 6 in units of pixels of the projection image. As a result, the shape measurement unit 60 has a function of measuring a three-dimensional shape of the physical object 6. At a lower right portion of FIG. 5, a front elevational view when the light reception surface of the shape measurement unit 60 is viewed in a direction of an arrow mark A is depicted.

As depicted in FIG. 5, the shape measurement unit 60 is structured such that light reception elements are arrayed on a surface thereof that has a hollow rectangular shape and has an opening 66 provided at the center thereof. Naturally, the reference laser light pass filter 62 also has a similar shape. The opening 66 forms an exit for the image laser light 57 and the reference laser light 59 that are reflected from the mirror 52. In particular, the shape measurement unit 60 detects reflected light of the reference laser light at a position circumscribing the emission port for the laser light. It is to be noted that, as long as the shape measurement unit 60 detects the reflected light of the reference laser light at the position circumscribing the emission port for the laser light, the shape of the opening 66 or the surface on which the light reception elements are arrayed is not restrictive.

In the present embodiment, laser light is applied sequentially for each pixel by the laser light scanning method. Therefore, even if the light reception surface of the shape measurement unit 60 is provided in such a manner as to circumscribe the emission port for the laser light as depicted in FIG. 5, the distribution of the acquisition positions of the distance on the surface of the physical object 6 and the distribution of the pixels on the projection image do not interfere with each other. As a result, while the resolution of the projection image is maintained, three-dimensional shape information relating to the physical object 6 on the same coordinate system can directly be acquired with the same resolution. Note that it is sufficient if the distance between the light reception element array of the shape measurement unit 60 and the emission port for the laser light remains within a minimum distance range in which it can be regarded that they contact with each other.

Further, by providing the light reception surface for reflected light such that it surrounds the opening 66 serving as the emission port for the laser light as depicted in FIG. 5, it is possible to cause the irradiation axis of the image laser light (and the reference laser light) and the center axis 67 of the light reception surface (vertical axis passing the center of the light reception surface) to coincide with each other. This makes it possible to perform projection of an image and acquisition of three-dimensional shape information on the same coordinate system whose origin is, for example, the center of the opening 66.

Consequently, detailed calibration in advance and complicated calculation for coordinate conversion become unnecessary, and three-dimensional shape information can be acquired with a high degree of accuracy while the calculation cost is kept low. The reference laser light 59 also arrives at the position of the surface of the physical object 6 at which the image laser light 57 arrives, and reflection of the reference laser light 59 can also be detected almost without a blind angle. Therefore, three-dimensional shape information necessary for image projection can be obtained without omission.

The image data outputting unit 10 acquires information F relating to a three-dimensional shape of the physical object 6 from the shape measurement unit 60 and performs adjustment of the image in such a manner as to correspond to the information F. The image data outputting unit 10 inputs data I of the image adjusted as occasion demands, to the image laser light source 50. By repeating the processes described above, it is possible to observe the three-dimensional shape of the physical object 6 on the spot and adjust and continue to project an image with a high degree of accuracy according to a result of the observation.

As an example, in a case where the physical object 6 is placed at a position spaced by 1 m from the emission port for the laser light, the time Δt elapsed from emission of the reference laser light to detection of reflected light is given by the following expression.

$$\Delta t = 1/(3.0 \times 10^8)[\text{m/sec}] \times 2[m] = 6.66[\text{nsec}]$$

If the frame rate of the projection image is 30 fps (frame/sec), then the number P of times by which a laser pulse can be emitted per one frame is given by the following expression.

$$P = 1/30[\text{fps}]/6.66[\text{nsec}] = 5 \times 10^6[\text{dots}]$$

If the resolution of the projection image is 1280×720 pixels, then the number p of times by which laser light can be emitted per one pixel is given by the following expression.

$$p = 5 \times 10^6[\text{dots}]/(1280 \times 720)[\text{pixel}] = 5.4[\text{dots/pixel}]$$

If it is assumed that the number of times of measurement for a period of time necessary to measure the distance with practical accuracy is approximately 500 and an ideal condition that reflected light of a pulse of laser light can be detected by all light reception elements is satisfied, then it is sufficient if approximately 100 light reception elements are disposed on the light reception surface of the shape measurement unit 60. The shape measurement unit 60 calculates a final distance value for which the influence of a detection error is reduced by, for example, averaging distance values for the number of times of detection.

Figure 6:
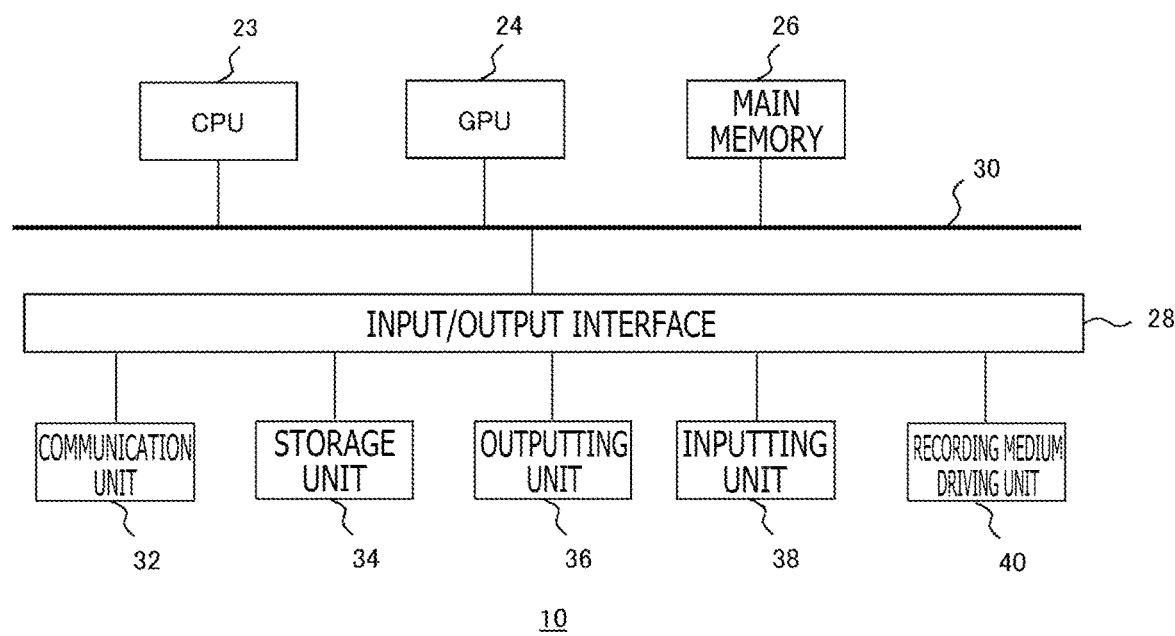
FIG. 6 is a block diagram depicting a configuration of an internal circuit of an image data outputting unit in the present embodiment.

FIG. 6 depicts a configuration of an internal circuit of the image data outputting unit 10. The image data outputting unit 10 includes a central processing unit (CPU) 23, a graphics processing unit (GPU) 24, and a main memory 26. The components of the image data outputting unit 10 are connected to each other by a bus 30. An input/output interface 28 is further connected to the bus 30.

To the input/output interface 28, a communication unit 32 for establishing communication with a server or the like, a storage unit 34 such as a hard disk drive or a nonvolatile memory, an outputting unit 36 that outputs data or a control signal to the image laser light source 50 and the mirror 52, an inputting unit 38 that inputs data from the shape measurement unit 60, and a recording medium driving unit 40 that drives a removable recording medium such as a magnetic disk, an optical disk, or a semiconductor memory are connected. The communication unit 32 includes a peripheral equipment interface of a universal serial bus (USB) or Institute of Electrical and Electronics Engineers (IEEE) 1394 or a network interface with a wired or wireless local area network (LAN).

The CPU 23 controls the entire image data outputting unit 10 by executing an operating system stored in the storage unit 34. The CPU 23 further executes various programs read out from the removable recording medium and loaded into the main memory 26 or downloaded via the communication unit 32. The GPU 24 has a function of a geometry engine and a function of a rendering processor, performs a drawing process according to a drawing command from the CPU 23, and outputs a result of the drawing process to the outputting unit 36. The main memory 26 includes a random access memory (RAN) and stores programs and data necessary for processing.

Figure 7:
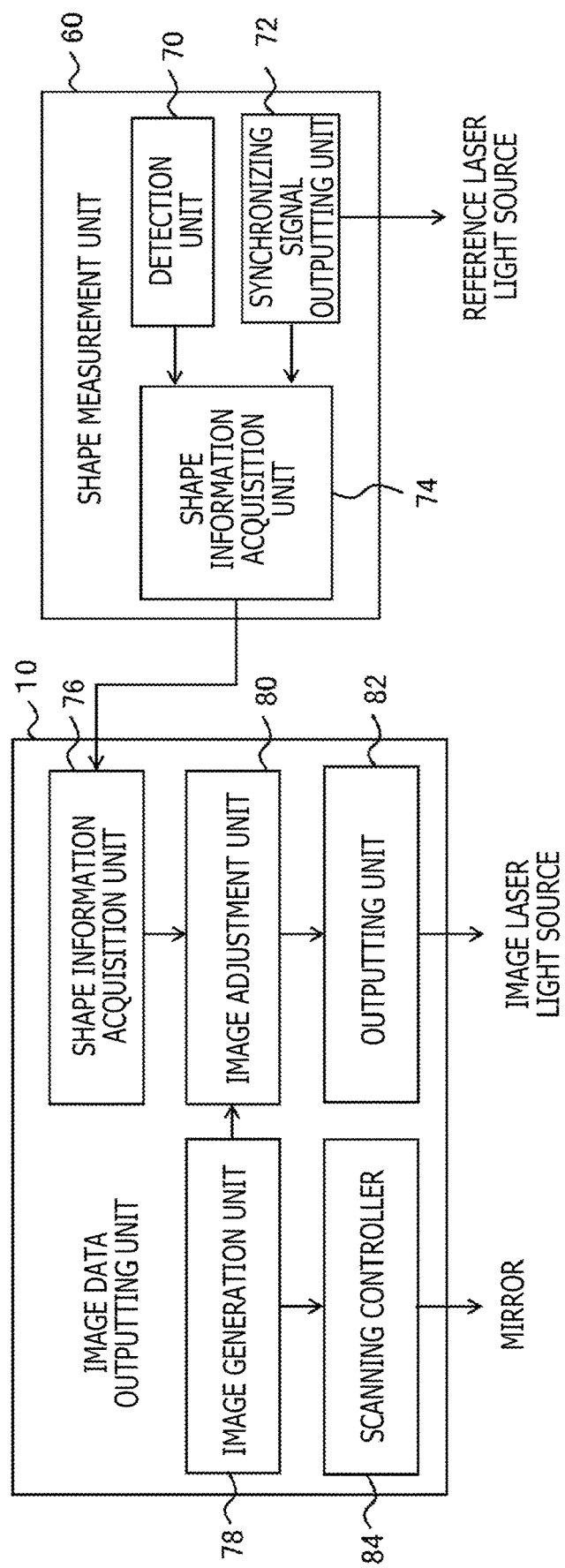
FIG. 7 is a block diagram depicting a configuration of functional blocks of the image data outputting unit and a shape measurement unit in the present embodiment.

FIG. 7 depicts a configuration of functional blocks of the image data outputting unit 10 and the shape measurement unit 60. The functional blocks depicted in FIG. 7 can be implemented, in hardware, by various sensors, a microprocessor, and so forth, in addition to the CPU 23, the GPU 24, and the main memory 26 depicted in FIG. 6. The functional blocks can be implemented, in software, by a program that is loaded from a recording medium into a memory and exerts various functions such as an information processing function, an image drawing function, a data inputting/outputting function, and a communication function. Accordingly, it can be recognized by those skilled in the art that the functional blocks described above can be realized only by hardware, only by software, or by a combination of hardware and software, and this is not restrictive.

Further, the image data outputting unit 10 and the shape measurement unit 60 may actually be a single device or may be implemented as three or more devices. Moreover, some of the functions of the image data outputting unit 10 depicted in FIG. 7 may be provided in the shape measurement unit 60, or some of the functions of the shape measurement unit 60 depicted in FIG. 7 may be provided in the image data outputting unit 10.

The shape measurement unit 60 includes a synchronizing signal outputting unit 72 that outputs a synchronizing signal to the reference laser light source 56, a detection unit 70 that detects reflection light of reference laser light, and a shape information acquisition unit 74 that acquires information relating to a three-dimensional shape of a physical object according to a result of the detection. The synchronizing signal outputting unit 72 generates a synchronizing signal that acts as a trigger to generation of a pulse of the reference laser light as described hereinabove and provides the synchronizing signal to the reference laser light source 56.

The detection unit 70 includes an array of light reception elements. The detection unit 70 detects light reflected from a physical object when a pulse of reference laser light generated, by the reference laser light source 56, in response to the synchronizing signal as a trigger is emitted to the physical object, and notifies the shape information acquisition unit 74 of the timing of the detection. The shape information acquisition unit 74 calculates an emission timing of a pulse of the reference laser light on the basis of the timing of the synchronizing signal generated by the synchronizing signal outputting unit 72. Then, the shape information acquisition unit 74 calculates the distance to the reflection position on the physical object according to the expression given hereinabove, on the basis of the time difference between the emission timing and the detection timing of the reflected light.

According to the configuration depicted in FIG. 5, the reference laser light 59 generated by the reference laser light source 56 is controlled in direction by rocking motion of the mirror 52 such that it is used for two-dimensional scanning of the surface of the physical object 6 together with the image laser light 57. Accordingly, the shape information acquisition unit 74 associates the position of a pixel in the emission direction of the reference laser light or on the projection image with the distance value calculated through detection of the reflected light, to make three-dimensional shape information relating to the physical object.

The image data outputting unit 10 includes a shape information acquisition unit 76, an image generation unit 78, an image adjustment unit 80, an outputting unit 82, and a scanning controller 84. The shape information acquisition unit 76 acquires information relating to a three-dimensional shape of a physical object. The image generation unit 78 generates an image to be projected on the physical object. The image adjustment unit 80 adjusts the image to be projected, on the basis of the three-dimensional shape information relating to the physical object, and the outputting unit 82 outputs data of the image to be projected. The scanning controller 84 controls scanning of the surface of the physical object with the laser light.

The shape information acquisition unit 76 acquires information relating to a three-dimensional shape of a physical object from the shape measurement unit 60. Here, the shape information acquisition unit 76 may sequentially acquire the information every time a distance value is measured by the shape measurement unit 60, or may acquire shape information after every predetermined number of units such as after every unit of frames of the projection image. Part of the acquisition process of three-dimensional shape information by the shape measurement unit 60 may be taken charge of by the shape information acquisition unit 76.

The image generation unit 78 generates data of a still picture of a moving picture to be projected on a physical object. Here, the image generation unit 78 may acquire image data generated in advance, from an external apparatus such as a server or from an internal memory device. Alternatively, the image generation unit 78 itself may draw an image by using a program or model data stored in advance in the internal memory device or the like. At this time, the image generation unit 78 may acquire a situation of the real space from an undepicted inputting device such as a camera, a sensor, or a controller as needed and reflect the situation on an image to be drawn. Alternatively, the image generation unit 78 may acquire shape information relating to a physical object from the shape information acquisition unit 76 and change the contents themselves of the image to be projected, on the basis of the acquired shape information.

The image adjustment unit 80 sequentially acquires information relating to a three-dimensional shape of a physical object from the shape information acquisition unit 76, and performs appropriate adjustment for an image generated by the image generation unit 78, according to the acquired information. The adjustment may be enlargement, reduction, deformation, rotation, shading, or the like of an image. Typically, the image adjustment unit 80 adjusts a frame to be projected next, on the basis of three-dimensional shape information obtained during a projection period of the immediately preceding frame. However, the temporal relation between acquisition of three-dimensional shape information and image adjustment is not restrictive.

The outputting unit 82 outputs data of an image, for which an adjustment process has been performed as occasion demands, to the image laser light source 50. The scanning controller 84 controls the angle of the mirror 52 such that the image laser light representative of each pixel arrives at an appropriate position on a surface of a physical object. The scanning controller 84 in the present embodiment further controls the mirror 52 such that the scanning speed with the laser light changes depending upon the position according to the contents of an image generated by the image generation unit 78.

In particular, the scanning controller 84 detects a region in which the accuracy necessary for shape information is higher than a standard level, on the basis of a characteristic of the image and so forth, and determines the region as a focused measurement region. For example, the scanning controller 84 determines a region of an image in which many textures exist, a region in which there exists an object that indicates a great movement, or a like region as a focused measurement region. Then, the scanning controller 84 sets the scanning speed with the laser light when an image for the region is projected lower than that for the other regions to thereby increase the number of times of emission and detection of the reference laser light.

As the number of times of detection of light reflected from the same pixel region increases, the final distance value calculated by averaging distance values for the number of times of detection, for example, becomes less likely to include an error. As a result, in the region for which the scanning speed with the laser light is decreased, the accuracy of three-dimensional shape information obtained in the region becomes higher, and consequently, the image in the region can be projected with a higher degree of accuracy. In the present embodiment, since an optical system of the laser light scanning method is used, flexible and partial control can be performed in this manner.

Figure 8A:
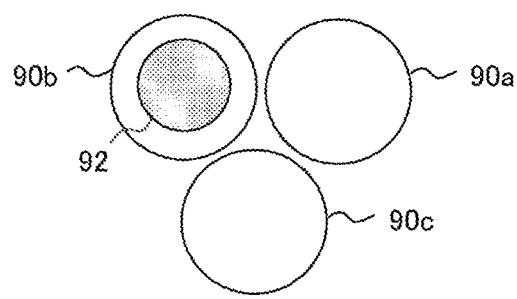
FIGS. 8A and 8B each depict a schematic view exemplifying a positional relation between image laser light and reference laser light upon emission of them in the present embodiment.
Figure 8B:
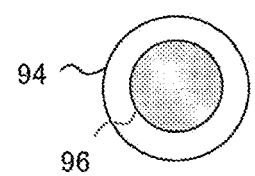

FIGS. 8A and 8B each exemplify a positional relation upon emission of image laser light and reference laser light. FIGS. 8A and 8B are each a conceptive diagram depicting a cross section of laser beams with which a physical object is irradiated. FIG. 8A illustrates a case in which laser beams 90a, 90b, and 90c of the three primary colors of R, G, and B are generated by the image laser light source 50. However, the arrangement of the laser beams 90a, 90b, and 90c is not restrictive.

In the case of FIG. 8A, the center axis of a reference laser beam 92 is preferably adjusted to the center axis of the green laser beam 90b. This arises from the fact that, as a visual sense characteristic of a human, the human is high in sensitivity to light of a wavelength of green and is likely to notice positional displacement of an image. In particular, by measuring the position on the surface of the physical object at which the green laser beam arrives with a higher degree of accuracy and adjusting the image according to a result of the measurement, the projection accuracy in visibility can be increased.

FIG. 8B illustrates a case in which a single laser beam 94 is generated by the image laser light source 50. In this case, it is sufficient if the center axis of a reference laser beam 96 is adjusted to the center axis of the laser beam 94. By mounting the image laser light source 50, the reference laser light source 56, and the beam splitter 58 with the orientation and the disposition of them adjusted appropriately, such positioning of the axes as depicted in FIG. 8B can be implemented.

Figure 9:
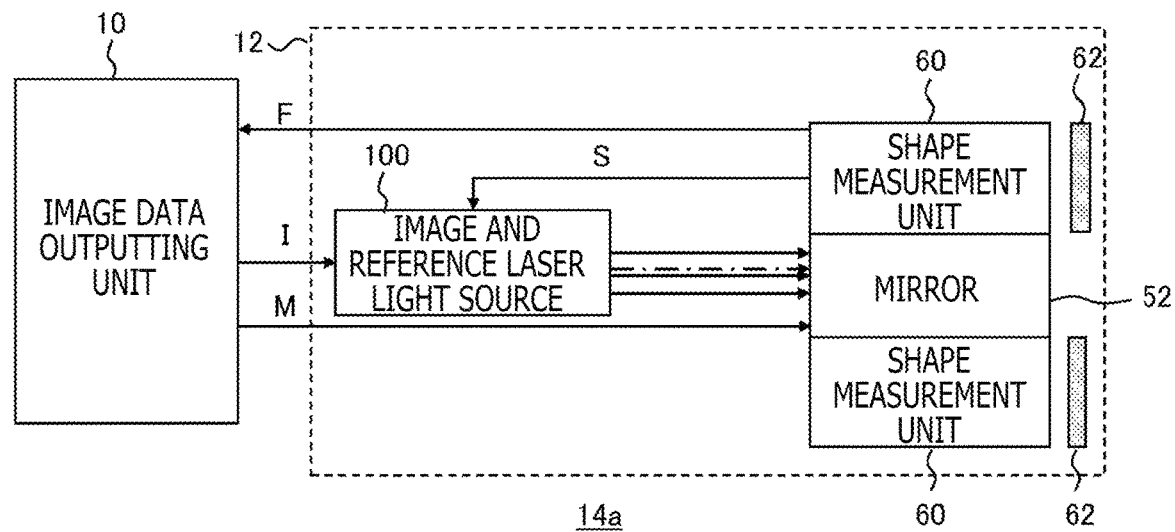
FIG. 9 is a block diagram depicting another example of the configuration of the image projection system in the present embodiment.

FIG. 9 depicts another example of the configuration of the image projection system according to the present embodiment. In FIG. 9, elements identical to those of the image projection system 14 depicted in FIG. 5 are denoted by identical reference signs. In particular, an image projection system 14a depicted in FIG. 9 includes the image data outputting unit 10, the shape measurement unit 60, the mirror 52, and the reference laser light pass filter 62 that are depicted in FIG. 5. On the other hand, in the present example, an image and reference laser light source 100 is provided in place of the image laser light source 50 and the reference laser light source 56. The image and reference laser light source 100 is a laser module that generates a laser beam for image projection and a laser beam for reference from the same surface.

In FIG. 9, that the image and reference laser light source 100 generates four laser beams including laser beams for R, G, and B and a laser beam for reference is indicated by four arrow marks. However, the number of image laser beams is not restrictive. Further, preferably, the positional relation between the image laser beams and the reference laser beam is made similar to the positional relations between them depicted in FIGS. 8A and 8B. The image and reference laser light source 100 generates image laser beams on the basis of the image data I obtained from the image data outputting unit 10 and generates a pulse of a reference laser beam in response to a synchronizing signal S from the shape measurement unit 60.

Other operations of the image projection system 14a may be similar to those described hereinabove with reference to FIG. 5. According to the present configuration, the image projection system can be scaled down in comparison with that of the configuration depicted in FIG. 5. Further, since there is no necessity to use a beam splitter, it is possible to allow laser beams generated from the image and reference laser light source 100 to arrive at a physical object while the light amounts of the laser beams are maintained. Therefore, the power consumption can be reduced.

Figure 10:
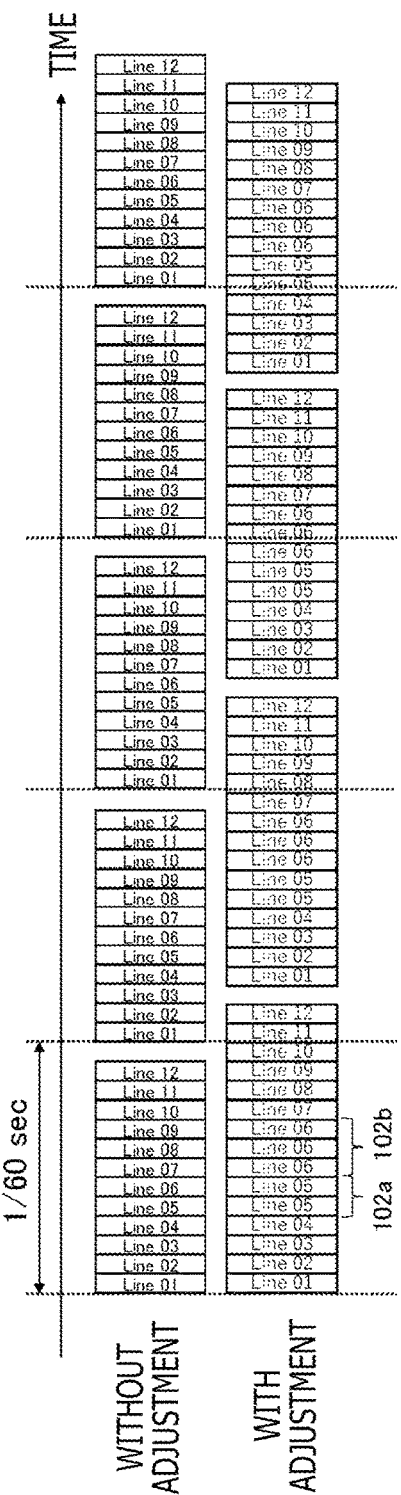
FIG. 10 is a view illustrating a mode in which a scanning controller in the present embodiment adjusts a scanning speed with laser light according to contents of an image.

FIG. 10 is a view illustrating a mode in which the scanning controller 84 adjusts the scanning speed with the laser light according to contents of an image. In order to facilitate understandings, in FIG. 10, a progress of projection in a case where an image including 12 rows of pixels is projected is indicated along a time axis directed in the rightward direction. On an upper stage and a lower stage in FIG. 10, the progress where the scanning speed is not adjusted and the progress where the scanning speed is adjusted are depicted, respectively, and each of rectangles arrayed on each stage represents a projection time period for one row. The frame rate set to the image is 60 fps as an example.

In a case where the scanning speed is not adjusted, at time denoted by "Line 01," "Line 02," . . . , and "Line 12," projection of pixel columns in the first row, the second row, . . . , and the 12th row of the image progresses at an equal speed as depicted on the upper stage, and the projection for one frame is completed within 1/60 seconds. Thereafter, similar projection is repeated cyclically, and display of frames progresses.

On the other hand, in a case where each of the fifth and sixth rows of the image is determined as a focused measurement region, the scanning controller 84 controls the mirror 52 such that the scanning speed for the rows ("Line 05" and "Line 06") is decreased as depicted on the lower stage. In the example of FIG. 10, for the fifth row ("Line 05"), the scanning speed is reduced to ½, and for the sixth row ("Line 06"), the scanning speed is reduced to ⅓. As a result, a projection time period 102a for the fifth row is adjusted to twice the standard time period, and a projection time period 102b for the sixth row is adjusted to three times the standard time period.

Consequently, in the regions on the physical object on which the fifth row and the sixth row of the image are to be projected, the distance is measured by a doubled number of times and a tripled number of times, respectively, and the accuracy of shape information can be improved as much. Such adjustment of the scanning speed causes such a situation that the period of time required to project an image for one frame exceeds 1/60 seconds, in some cases. In other words, the frame rate is displaced slightly from the set value therefor. On the other hand, control with a high degree of freedom in comparison with that by a projector including light emitting elements arrayed two-dimensionally can be facilitated.

The scanning controller 84 may set a focused measurement region row by row of an image as depicted in FIG. 10, or may set a focused measurement region otherwise pixel by pixel or region by region. Meanwhile, information on which determination of a focused measurement region is based may be acquired by the scanning controller 84 analyzing an image generated by the image generation unit 78. Alternatively, a focused measurement region may be determined by the scanning controller 84 acquiring information regarding a texture used when the image generation unit 78 generates an image, a movement of a determined object, or a position of an important object.

Alternatively, information that associates a frame number and a focused measurement region in the frame with each other may be created in advance and included into image data that is read out when the image generation unit 78 generates an image. It is to be noted that the scanning speed in a focused measurement region may be set in a plurality of stages according to a degree of accuracy required for shape information, as in the case of the example depicted in FIG. 10 in which, for the fifth row, the scanning speed is reduced to ½ and, for the sixth row, the scanning speed is reduced to ⅓, or may otherwise be set in only one stage.

Further, although, in the example depicted in FIG. 10, scanning with a similar speed configuration is repeated for the succeeding frames, the scanning controller 84 may naturally change the focused measurement region or the scanning speed in the focused measurement region with respect to time according to contents of the image. Moreover, the scanning controller 84 may switch whether or not the scanning speed is to be adjusted, depending on appearance or disappearance of a focused measurement region. The scanning controller 84 may determine a focused measurement region or a scanning speed in the focused measurement region on the basis not only of contents of an image but also of a shape of a physical object, a movement of the physical object, a distance to the physical object, a line of sight of an appreciator, or the like.

For example, the scanning controller 84 may determine, as a focused measurement region, a region on an image that is being projected on a portion of a surface of a physical object at which fine unevenness exists or at which the shape change is great. In such a case as just described, the scanning controller 84 acquires three-dimensional shape information obtained last, from the shape information acquisition unit 76, or acquire information relating to a gazing point of an appreciator from an undepicted gazing point detector. Then, the scanning controller 84 determines, as a focused measurement region, a region in which the obtained parameter or parameters satisfy a condition set in advance. The number of parameters to be used for determination of a focused measurement region may be one or otherwise may be two or more in combination.

Figure 11:
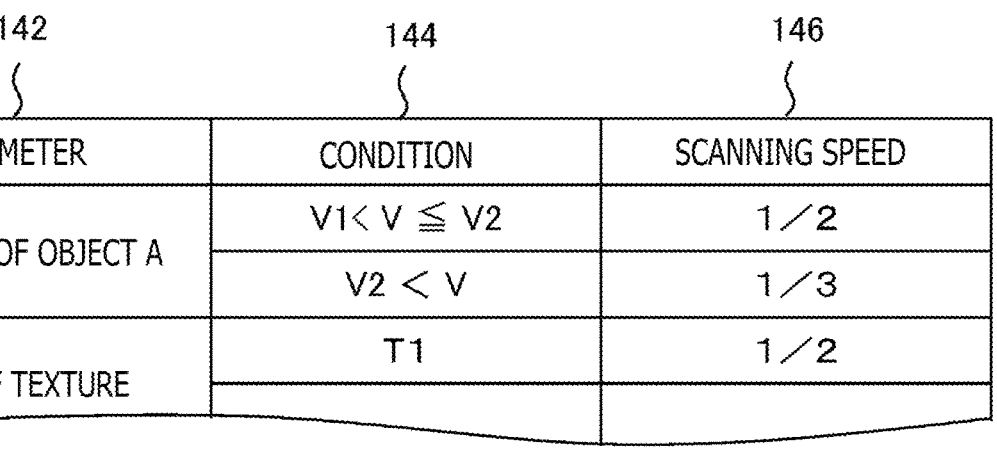
FIG. 11 is a view depicting an example of setting of a rule when the scanning controller in the present embodiment adjusts the scanning speed with laser light.

FIG. 11 depicts an example of setting of a rule for the adjustment of the scanning speed with laser light by the scanning controller 84. In the example depicted, a rule setting table 140 associates a parameter 142 on which adjustment is based, a condition 144 for triggering adjustment, and a target value 146 for the scanning speed when the condition is satisfied with each other. However, the setting form and the contents of the adjustment rule in the present embodiment are not restrictive. FIG. 11 depicts a setting that, as an example, when the "speed V of object A" is made the base of adjustment and the condition of "V1<V≤V2" is satisfied, a region on the image in which the object A is represented is determined as a focused measurement region.

When this condition is satisfied, the target value of the scanning speed with laser light in the focused measurement region is ½ the standard value. Further, when the "speed V of object A" is "V2<V," the target value of the scanning speed with laser light is ⅓ the standard value. Moreover, in FIG. 11, it is also set that, when the "type of texture" is also the base of adjustment and a region on an image in which a texture "T1" is represented is made a focused measurement region, the scanning speed with laser light in the focused measurement region is ½ the standard value. It is to be noted that each of V1, V2, and T1 actually is a particular speed or a particular name of texture. The scanning controller 84 retains such setting rules as depicted in FIG. 11 in an internal memory or the like. Then, the scanning controller 84 supervises the set parameters to determine whether or not they satisfy the conditions, to determine whether or not adjustment of the scanning speed with laser light is required and determine a focused measurement region and a target value of the scanning speed.

According to the present embodiment described above, an image is projected on a physical object by the laser light scanning method, and reference laser light for shape measurement is applied through an emission port common to image laser light to a physical object. Consequently, reflected light of the reference laser light can be detected at a position contacting with the emission port for the image laser light, and three-dimensional shape information relating to the physical object on a coordinate system that is based on the emission plane can directly be acquired. As a result, the projection image and a two-dimensional array of distance values can be obtained both in a high resolution without interfering with each other.

Further, there is no necessity to perform calibration in advance or coordinate conversion between an optical system for image projection and an optical system for distance measurement, so that the calculation cost can be reduced and the possibility that a computation error may occur can be reduced. Moreover, since the shape of a portion of a surface of a physical object at which the image laser light arrives can be measured without causing a blind angle, more accurate image projection can be achieved. In addition, in comparison with an alternative case in which a micromirror device, a projector for infrared rays, an infrared camera, or the like is introduced, the production cost can be reduced, and the overall apparatus can be scaled down. As a result, projection mapping of high accuracy can easily be implemented at a low cost.

The present disclosure has been described in connection with the embodiment. The embodiment described above is exemplary, and it is recognized by those skilled in the art that various modifications are possible in regard to the combinations of the components and the processing procedures of the embodiment described above and that such modifications also fall within the scope of the present disclosure.

What is claimed is:

1. An image projection system comprising:
   an image projection unit that irradiates a physical object with image laser light for forming pixels of an image to be projected on the physical object;
   a reference light irradiation unit that irradiates the physical object with reference laser light emitted;
   wherein the image laser light and the reference laser light are emitted through a same emission port;
   a shape measurement unit that detects the reference laser light reflected from the physical object and measures a three-dimensional shape of the physical object on a basis of a result of the detection; and
   wherein the shape measurement unit is located at a position circumscribing the emission port.

2. The image projection system according to claim 1, wherein
   the image projection unit includes a mirror that reflects the image laser light such that an arriving point of the image laser light two-dimensionally scans a surface of the physical object and then causes the image laser light to be emitted through the emission port, and
   the mirror reflects the reference laser light together with the image laser light.

3. The image projection system according to claim 1, wherein
   the shape measurement unit detects the reference laser light reflected from the physical object, by light reception elements that are arrayed surrounding the emission port on a plane having a center axis coincident with an irradiation axis of the image laser light.

4. The image projection system according to claim 2, wherein
   the reference light irradiation unit includes a light source of the reference laser light placed at a position different from that of a light source of the image laser light, and a light splitter that introduces the reference laser light generated from the light source of the reference laser light to the mirror.

5. The image projection system according to claim 2, wherein
   the reference light irradiation unit includes a light source of the reference laser light provided integrally with a light source of the image laser light.

6. The image projection system according to claim 1, wherein
   the image projection unit applies, as the image laser light, light of red, light of green, and light of blue, and
   the reference light irradiation unit applies the reference laser light coaxially with the laser light of green of the image laser light.

7. The image projection system according to claim 1, wherein
   the shape measurement unit acquires a distance to a reflection position on a surface of the physical object on a basis of a time difference between an emission timing of the reference laser light and a detection timing of the reflected light.

8. The image projection system according to claim 1, further comprising:
   an image data outputting unit that adjusts an image to be projected according to a result of the measurement of the three-dimensional shape and outputs data of the adjusted image to the image projection unit.

9. The image projection system according to claim 2, further comprising:

a scanning controller that determines a focused measurement region in the image and controls the mirror such that a scanning speed in the focused measurement region in the two-dimensional scanning is made slower than that in another region to thereby increase the number of times of detection of the reference laser light by the shape measurement unit in the focused measurement region.

10. The image projection system according to claim 9, wherein the scanning controller determines the focused measurement region on a basis of at least one of a characteristic of the image, a result of the measurement of the three-dimensional shape, setting information, and a line of sight of an appreciator.

11. The image projection system according to claim 9, wherein the scanning controller adjusts the scanning speed in the focused measurement region to a plurality of stages.

12. An image projection method by an image projection system, comprising:

irradiating a physical object with image laser light for forming pixels of an image to be projected on the physical object;

irradiating the physical object with reference laser light;

wherein the image laser light and the reference laser light are emitted through a same emission port;

detecting the reference laser light reflected from the physical object and measuring a three-dimensional shape of the physical object on a basis of a result of the detection; and wherein the system detects the reflected reference laser light at a position circumscribing the emission port.

\* \* \* \* \*